US012354141B2

(12) United States Patent
Kern et al.

(10) Patent No.: US 12,354,141 B2
(45) Date of Patent: Jul. 8, 2025

(54) ALLOCATION METERING FOR VIRTUAL MACHINES AND CONTAINERS

(71) Applicant: Lenovo Global Technology (United States) Inc., Morrisville, NC (US)

(72) Inventors: Eric R. Kern, Chapel Hill, NC (US); Robert Furda, Bratislava (SK); Brian E. Finley, Allen, TX (US); Firoz Rangwalla, Suwanee, GA (US); Paola Martinez Morales, Wendell, NC (US); Asmaa El Andaloussi, Asnieres-sur-Seine (FR)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 720 days.

(21) Appl. No.: 17/592,325

(22) Filed: Feb. 3, 2022

(65) Prior Publication Data

US 2023/0245184 A1 Aug. 3, 2023

(51) Int. Cl.
*G06Q 30/04* (2012.01)
*G06F 9/455* (2018.01)

(52) U.S. Cl.
CPC ......... *G06Q 30/04* (2013.01); *G06F 9/45533* (2013.01); *G06F 9/45558* (2013.01); *G06F 2009/45591* (2013.01)

(58) Field of Classification Search
None
See application file for complete search history.

(56) References Cited

U.S. PATENT DOCUMENTS

| 8,660,129 | B1* | 2/2014 | Brendel | H04L 67/10 370/397 |
| 2014/0279320 | A1* | 9/2014 | Scheinblum | G06Q 30/04 705/34 |
| 2019/0253742 | A1* | 8/2019 | Garten | H04N 21/8456 |
| 2022/0011843 | A1* | 1/2022 | MacNamara | G06F 11/3062 |

* cited by examiner

*Primary Examiner* — Eric C Wai
(74) *Attorney, Agent, or Firm* — Kunzler Bean & Adamson; Bruce R. Needham (57) ABSTRACT

A method for allocation metering for virtual machines and containers includes gathering virtual structure ("VS") allocation data for one or more virtual structures running on one or more servers at a customer location of a customer. a virtual structure includes a virtual machine ("VM") or a container. The VS allocation data is for a virtual structure of the one or more virtual structures that include allocation of virtual resources for the virtual structure. The customer leases computing resources from an owner. The method includes periodically transmitting VS allocation data to an owner server of the owner over a management network different than a computer network servicing workloads of the virtual structures. The owner server is located off-premises from the customer location. Billing information is calculated at the owner server from the VS allocation data and includes a cost for virtual resources allocated to the virtual structures for the billing period.

20 Claims, 7 Drawing Sheets

ALLOCATION METERING FOR VIRTUAL MACHINES AND CONTAINERS

FIELD

The subject matter disclosed herein relates to billing of leased computing resources and more particularly relates to allocation metering for virtual machines and containers.

BACKGROUND

Infrastructure-as-a-Service ("IaaS") in cloud computing models allows customers to transform the cost of computing resources to an operational expenditure. Private cloud computing models typically have infrastructure resources installed in a customer data center and managed by a cloud service provider. In such cases, usage metering data are typically collected by various methods from on-premises deployment and sent to off-premises at the cloud service provider to calculate a bill. Metering and billing are crucial part of consumption models in cloud computing. Periodic collection of metering data from resources at customer data center is crucial for proper billing.

BRIEF SUMMARY

A method for allocation metering for virtual machines and containers is disclosed. An apparatus and computer program product also perform the functions of the method. The method includes gathering virtual structure ("VS") allocation data for one or more virtual structures running on one or more servers at a customer location of a customer, a virtual structure includes a virtual machine ("VM") or a container. The VS allocation data is for a virtual structure of the one or more virtual structures that include allocation of virtual resources for the virtual structure. The customer leases computing resources from an owner. The method includes periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data and the billing information includes a cost for virtual resources allocated to the one or more virtual structures fora billing period.

An apparatus for allocation metering for virtual machines and containers includes a processor and non-transitory computer readable storage media storing code. The code is executable by the processor to perform operations that include gathering VS allocation data for one or more virtual structures running on one or more servers at a customer location of a customer. A virtual structure is a VM or a container. The VS allocation data for a virtual structure of the one or more virtual structures includes allocation of virtual resources for the virtual structure. The customer leases computing resources from an owner. The operations include periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data and the billing information includes a cost for virtual resources allocated to the one or more virtual structures for a billing period.

A program product for allocation metering for virtual machines and containers includes a non-transitory computer readable storage medium storing code. The code is configured to be executable by a processor to perform operations that include gathering VS allocation data for one or more virtual structures running on one or more servers at a customer location of a customer. A virtual structure includes a VM or a container. The VS allocation data is for a virtual structure of the one or more virtual structures that includes allocation of virtual resources for the virtual structure. The customer leases computing resources from an owner. The operations include periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data. The hilling information includes a cost for virtual resources allocated to the one or more virtual structures for a billing period.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for allocation metering for virtual machines and containers is disclosed. An apparatus and computer program product also perform the functions of the method. The method includes gathering virtual structure ("VS") allocation data for one or more virtual structures running on one or more servers at a customer location of a customer. a virtual structure includes a virtual machine ("VM") or a container. The VS allocation data is for a virtual structure of the one or more virtual structures that include allocation of virtual resources for the virtual structure. The customer leases computing resources from an owner. The method includes periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data and the billing information includes a cost for virtual resources allocated to the one or more virtual structures for a billing period.

In some embodiments, the method includes receiving power consumption data from the one or more servers, and transmitting the power consumption data to the owner server. The billing information includes the cost for the virtual resources allocated to the one or more virtual structures and power consumption over a threshold. In other embodiments, transmitting the power consumption data includes transmitting the power consumption data using a streaming protocol that assures the power consumption data is received at the owner server. In other embodiments, receiving the power consumption data includes receiving, over the management network, power consumption data from a management controller running on each of the one or more servers at the customer location.

In some embodiments, the virtual resources allocated to the one or more virtual structures for the billing period include an average of the virtual resources allocated to the one or more virtual structures for the billing period. In other embodiments, transmitting the VS allocation data includes transmitting the VS allocation data over a secure communication protocol using full-duplex communication over a single web connection. In other embodiments, the method includes receiving access to the billing information regarding a billing period of the VS allocation data. In other embodiments, the VS allocation data for a virtual structure of the one or more virtual structures includes a number of virtual central processing units ("CPUs") allocated to the virtual structure, virtual memory allocated to the virtual structure, and/or virtual data storage allocated to the virtual structure.

In some embodiments, gathering the VS allocation data includes gathering the VS allocation data from a virtualization layer of an application controlling the one or more virtual structures. In other embodiments, gathering the VS allocation data includes gathering the VS allocation data using a management application protocol interface ("API") to receive the VS allocation data over a secure communication protocol using full-duplex communication over a single web connection. In other embodiments, periodically transmitting, over the management network, the VS allocation data to the owner server includes periodically transmitting the VS allocation data over a virtual private network between a management server at the customer location and the owner server located off-premises from the customer location.

An apparatus for allocation metering for virtual machines and containers includes a processor and non-transitory computer readable storage media storing code. The code is executable by the processor to perform operations that include gathering VS allocation data for one or more virtual structures running on one or more servers at a customer location of a customer. A virtual structure is a VM or a container. The VS allocation data for a virtual structure of the one or more virtual structures includes allocation of virtual resources for the virtual structure. The customer leases computing resources from an owner. The operations include periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data and the billing information includes a cost for virtual resources allocated to the one or more virtual structures for a billing period.

In some embodiments, the operations include receiving power consumption data from the one or more servers and transmitting the power consumption data to the owner server. In the embodiments, the billing information includes the cost for the virtual resources allocated to the one or more virtual structures and power consumption over a threshold. In other embodiments, transmitting the power consumption data includes transmitting the power consumption data using a streaming protocol that assures the power consumption data is received at the owner server. In other embodiments, receiving the power consumption data includes receiving, over the management network, power consumption data from a management controller running on each of the one or more servers at the customer location.

In some embodiments, the virtual resources allocated to the one or more virtual structures for the billing period includes an average of the virtual resources allocated to the one or more virtual structures for the billing period. In other embodiments, transmitting the VS allocation data includes transmitting the VS allocation data over a secure communication protocol using full-duplex communication over a single web connection. In some embodiments, the secure communication protocol is a secure bi-directional connection supporting real-time data transmission. In other embodiments, the VS allocation data for a virtual structure of the one or more virtual structures includes a number of virtual CPUs allocated to the virtual structure, virtual memory allocated to the virtual structure, and/or virtual data storage allocated to the virtual structure. In other embodiments, the operations include receiving access to billing information regarding a billing period of the VS allocation data.

A program product for allocation metering for virtual machines and containers includes a non-transitory computer readable storage medium storing code. The code is configured to be executable by a processor to perform operations that include gathering VS allocation data for one or more virtual structures running on one or more servers at a customer location of a customer. A virtual structure includes a VM or a container. The VS allocation data is for a virtual structure of the one or more virtual structures that includes allocation of virtual resources for the virtual structure. The customer leases computing resources from an owner. The operations include periodically transmitting, over a management network, VS allocation data to an owner server of the owner. The owner server is located off-premises from the customer location. The management network is different than a computer network servicing workloads of the one or more virtual structures on the one or more servers. Billing information is calculated at the owner server from the VS allocation data. The billing information includes a cost for virtual resources allocated to the one or more virtual structures for a billing period.

In some embodiments, the code is further configured to be executable by a processor to perform operations that include receiving power consumption data from the one or more servers and transmitting the power consumption data with the VS allocation data. In the embodiments, the billing information includes the cost for the virtual resources allocated to the one or more virtual structures and power consumption over a threshold.

Figure 1:
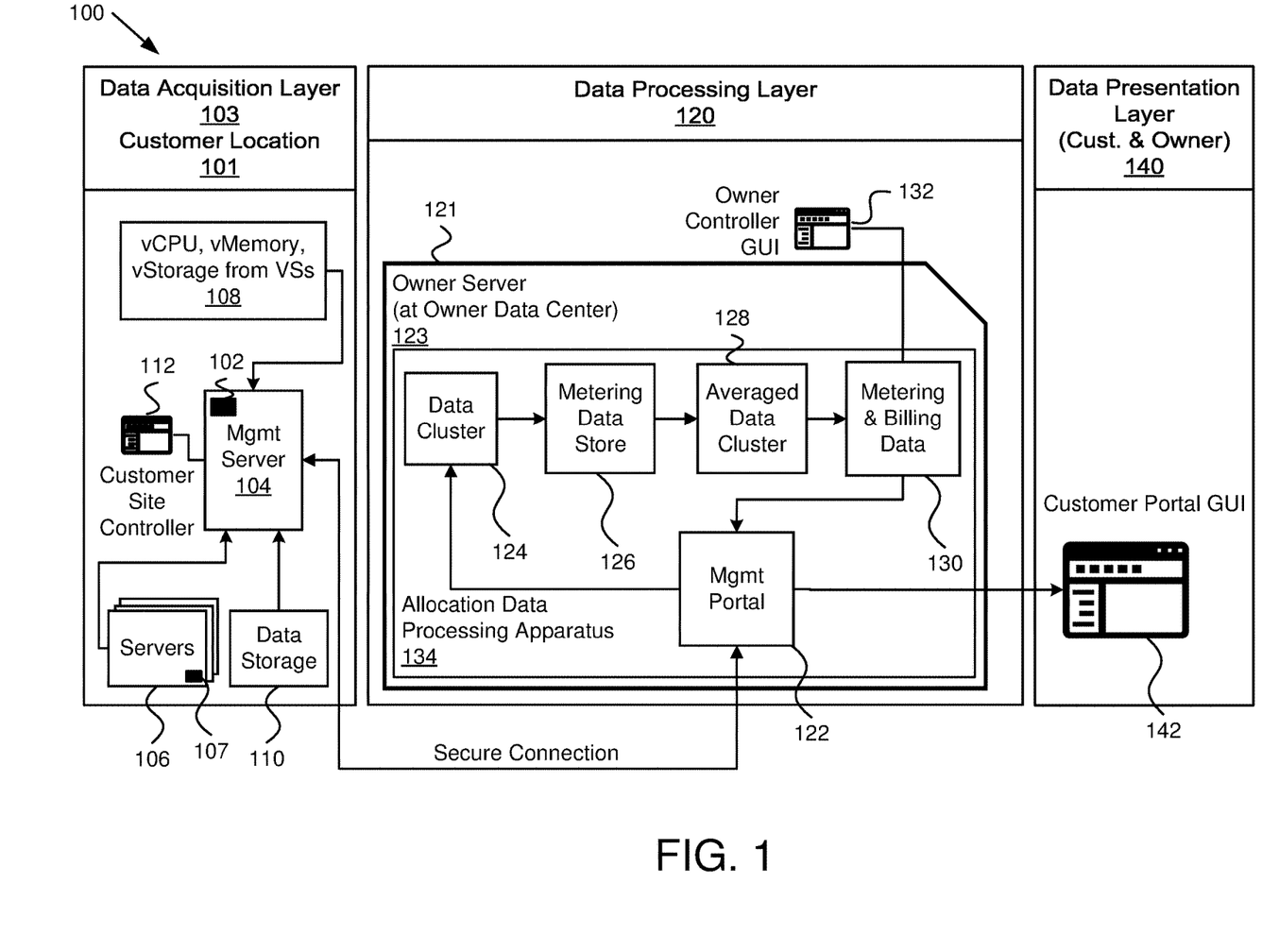
FIG. 1 is a schematic block diagram illustrating a system for allocation metering, according to various embodiments.

FIG. 1 is a schematic block diagram illustrating a system 100 for allocation metering, according to various embodiments. The system 100 includes a data acquisition layer 103 at a customer location 101 (on-premises site) with an allocation billing apparatus 102 in a management server 104, servers 106 each with a management controller, a virtualization layer 108 with virtual allocation data from virtual central processing units ("CPUs"), virtual memory, and virtual data storage from one or more virtual structures ("virtual structures") running on the servers 106, data storage 110 and a customer site controller GUI 112. The system 100 includes a data processing layer 120 at an owner location 121 (off-premises site), which includes an owner server 123, with a management portal 122, a data cluster 124, a metering data store 126, an averaged data cluster 128, metering and billing data processing module 130, and an allocation bill processing apparatus 134. Off-premises is also an owner controller graphical user interface ("GUI") 132. The system 100 includes a data presentation layer 140 accessible to the customer and owner that includes a customer portal GUI 142. Components of the system 100 are described below.

Often a vendor (e.g. owner) will lease computing resources to a customer where the computing resources are located at a customer location 101 (on-site premises) located remotely from an owner location 121 (off-site premises), which may be an owner data center with an owner server 123. The computing resources include servers 106, data storage 110, memory, and the like. The customer location 101 may be a data center for cloud computing where clients of the customer run workloads on one or more virtual machines ("VMs") containers running on the servers 106. As used herein a virtual machine is a virtual structure ("VS"). Likewise, a container is a virtual structure. Other similar structures running virtually on a server 106 may also be a virtual structure. In some embodiments, the servers 106, data storage 110, and other equipment include a hypervisor that controls the virtual structures. Typically, the servers 106 each include a management controller 107, which may be called a baseboard management controller ("BMC"). One example of a management controller 107 is a Lenovo® XClarity® Controller ("XCC").

Typically, the management controller 107 is connected to a management network separate from a computer network used by the VMs, containers, and servers 106 for communications, workloads, etc. The management controllers 107 typically have access to various components of the servers 106 and are able to control the components, report alerts and other data from the components and manage the components. In some embodiments, a management controller 107 is able to access components of the server 106 when the server is not running and is often able to reboot the server 106.

The management controllers 107, in some embodiments, include a power metering function to meter power consumed by the servers 106. Often, the management controller 107 also is able to monitor power usage of various components, such as CPUs, memory, data storage, power supplies, etc. of the server 106.

In some embodiments, the management controllers 107 of the servers 106, data storage 110, etc. are connected to a management server 104 that acts as a gateway for external communications. The management server 104, in some embodiments, is a Lenovo XClarity Administrator ("LXCA"). In some embodiments, the management server 104 is accessible over a private and/or secure connection. In some embodiments, a system administrator is able to access the management server 104 via virtual private network ("VPN") over a public computer network, such as the Internet. In other embodiments, the secure connection between the management server 107 and other devices, such as the owner server 123, is implemented using another secure communications protocol. In embodiments described herein, the owner server 123 is able to communicate with the management server 104 and is able to receive metering data, which is explained further below.

A virtual machine is a virtual structure that typically runs a separate instance of an operating system. VMs are used by clients to run workloads and are designed with certain security features. Typically, VMs are separated from each other so that data from a VM does not see data from another VM. VMs typically run a complete operating system, including a separate kernel. A container is a lightweight virtual structure that has some separation from VMs and other containers but may not have separate instance of an operating system. A container, in some embodiments, is an isolated, lightweight silo for running an application on a host operating system. Containers often build on top of the host operating system's kernel and typically contain only applications and some lightweight operating system application programming interfaces ("APIs") and servers that run in user mode. Both VMs and containers can be set up with allocated virtual resources.

A virtual structure, in some embodiments, is allocated a certain number of virtual CPUs. A server typically includes multiple CPUs or cores controlled by the hypervisor or other management device. A virtual CPU ("vCPU") is allocated to a VM or container but the actual CPU executing code for the virtual CPU may be assigned by the hypervisor. From the perspective of the VM or container, the virtual CPU is a dedicated CPU, but may in actuality be running on any of a number of physical CPUs. Typically, a physical CPU is able to support a certain number of vCPUs. In some examples, a physical CPU supports up to five vCPUs. Other physical CPUs support other numbers of vCPUs.

A virtual structure, in some embodiments, has a maximum number of vCPUs that can be allocated to the virtual structure. In some examples, a VM may have a maximum of eight vCPUs. At any particular time, the virtual structure may be allocated some number of vCPUs, which may change over time. For example, a VM may be required to run quarterly reports, which take a lot of computing resources, but may have a lighter workload during periods when not running the quarterly reports. In such instances, the VM may be allocated two vCPUs during non-peak times and eight vCPUs during peak times. Embodiments described herein enable billing based on the number of currently allocated vCPUs rather than the maximum allowed vCPUs.

Often, physical CPUs are oversubscribed with virtual CPUs. For example, a server 106 may include eight physical CPUs, where each physical CPU may have eight vCPUs so there may be up to 40 vCPUs for a server 106. In reality, the vCPUs are not always running at full capacity, which lends itself to oversubscription of the physical CPUs. The management controllers 107 are able to monitor power usage and other metrics for the physical CPUs to have a right amount of oversubscription. Thus, where customers are billed based on allocated vCPUs, profit margin for the owner varies based on the amount of actual physical CPUs at the customer location 101.

Virtual memory ("vMemory") may also be allocated to a virtual structure. As with the physical CPUs, physical memory may be oversubscribed using virtual memory allocated to virtual structures. As used herein, memory is volatile memory typically accessible to CPUs over a high speed bus. Memory may be divided into various levels or cache and may be of various speeds and classes. Virtual data storage ("vStorage") may also be allocated to virtual structures. As used herein, data storage is non-volatile memory. Data storage may include solid-state memory, hard disk drives, optical drives and the like. As with physical CPUs, memory and data storage may be allocated to VMs and containers. Virtual memory may be allocated to a virtual structure. Virtual data storage may also be allocated to a virtual structure.

As with physical CPUs, physical memory and physical data storage may be oversubscribed. Virtual memory allocated to a virtual structure appears to the virtual structure as dedicated memory, but the hypervisor is able to map a portion of physical memory to the virtual memory of a virtual structure. Likewise, physical data storage may include various physical devices, data storage of different types, etc. Physical data storage may appear as a virtual block of storage but may map to several data storage devices in a redundant array of independent disks ("RAID"). Again, from the perspective of the virtual structure, the virtual data storage appears as dedicated data storage. Oversubscription of memory and data storage allows the owner to provide a client setting up a virtual structure with the resources the client desires but the physical resources have less capacity than the allocated virtual resources. Embodiments described herein enable billing based on actual allocated virtual memory and/or actual allocated virtual data storage, which may change as workloads of the client's virtual structure change.

The data acquisition layer 103 includes a virtualization layer 108 that provides access to virtualization information of each virtual structure, such as currently allocated vCPUs, maximum number of vCPUs, a maximum allowable amount of allocated virtual memory, currently allocated virtual memory, a maximum allowable amount of allocated virtual data storage, currently allocated virtual data storage, and the like. In some examples, the management server 104 has access to the virtualization layer 108 or to virtual structure ("VS") allocation data available from the virtualization layer 108.

The VS allocation data, in some embodiments, is created, updated, etc. when a virtual structure is created or updated. For example, a system administrator may access an interface to set up the VS allocation data for a virtual structure when creating the virtual structure. In some examples, the system administrator uses the customer site controller GUI 112, which may be running on the management server 104 or other server, to set up or update a virtual structure. In some embodiments, a hypervisor plays a role in creating and updating the virtual structure. One of skill in the art will recognize other ways to input VS allocation data in the virtualization layer 108.

The customer location 101 includes data storage 110 or access to data storage 110 that may be allocated to a virtual structure. The data storage 110 may include data storage within a server 106, data storage 110 in a computer rack, access to a storage area network ("SAN"), or other non-volatile data storage device. One of skill in the art will recognize other ways to implement data storage 110 that can be allocated to a virtual structure.

The customer location 101 includes an allocation billing apparatus 102 running on the management server 104. The allocation billing apparatus 102, in some embodiments, gathers VS allocation data from the virtualization layer 108 and/or power consumption data from the servers 106, periodically transmits the VS allocation data and/or power consumption data to the owner server 123, and may also receive access to billing information corresponding to the VS allocation data and/or power consumption data. The allocation billing apparatus 102 is explained in more detail below with regards to the apparatuses 200, 300 of FIGS. 2 and 3.

The data processing layer 120 is used herein to describe actions associated with receiving VS allocation data and power consumption data, processing the data and creating billing information for the customer. The data processing layer 120 is off-premises and, in some embodiments, is at the owner location 121, which may be part of an owner data center. An allocation bill processing apparatus 134 running on an owner server 123 at the owner location 121 receives the VS allocation data and/or power consumption data, calculates average power consumption and/or average VS allocation data for a billing period, calculates a cost of the allocation data and/or the cost of the power consumption data and then provides access to billing information. The allocation bill processing apparatus 134 is explained in more detail with regards to the apparatus 400 of FIG. 4.

The owner server 123 includes a management portal 122 that receives data from the management server 104. Typically, the management portal 122 receives data from the management server 104 over a secured connection, such as a VPN. The management portal 122, in some embodiments, interacts with hardware of the owner server 123, such as a network interface card ("NIC") for receiving or importing data from the management server 104. In some embodiments, the management portal 122 is running on a processor of the owner server 123. In some embodiments, the management portal is a Lenovo® XClarity® Orchestrator ("LXCO"). In other embodiments, the management portal 122 is from another vendor.

The owner server 123 includes a data cluster 124. In some embodiments, the data cluster 124 is a database or other data structure configured to store raw metering data, such as the VS allocation data and the power consumption data. For example, the raw metering data is received at the management portal 122 and stored in the data cluster 124 by a secure process that ensures that the raw metering data is intact and valid before any data is removed from the location where it was transmitted, such as from the management server 104. In some embodiments, the data cluster 124 is a Kafka data cluster. In some examples, the Kafka cluster may be controlled by an Apache Kafka application. In other embodiments, the Kafka cluster is created and controlled by another real-time data streaming software application.

The owner server 123 includes, in some embodiments, a metering data store 126 that includes metering data from the customer location 101. The metering data store 126, in some embodiments, is a data consumer and pulls data from the data cluster 124. In some embodiments, the metering data store 126 and the data cluster 124 are in a same data storage device or system and the metering data store 126 pulls or identifies metering data for a particular billing period.

The owner server 123 or other computing device at the owner location 121 includes an averaged data cluster 128 that includes metering data that is averaged over a particular time period, such as over a billing period. In some embodiments, the averaged data cluster 128 is a Kafka cluster. In some examples, power consumption data is sampled at a small time increment, such as every second, every minute, every 10 minutes, etc. and is averaged over a particular time period, such as one hour, and is stored in the averaged data cluster 128. In other embodiments, VS allocation data in the metering data store 126 pertaining to a particular billing period is averaged and stored in the averaged data cluster 128.

The owner server 123 or other computing device at the owner location 121 includes a metering and billing data processing module 130 that uses averaged metering data from the averaged data cluster 128 for a particular billing period and calculates billing information from the averaged metering data. In some embodiments, the metering and billing data processing module 130 uses VS allocation data to calculate the billing information. In some embodiments, the VS allocation data is not averaged. For example, some VS allocation data may not change over a billing period or over some other time period during the billing period and is not averaged.

In some embodiments, the metering and billing data processing module 130 multiplies a billing rate by a portion of the VS allocation data to determine a portion of the billing information. In some examples, the currently allocated number of vCPUs of a virtual structure is multiplied by a vCPU billing rate. In some embodiments, the metering and billing data processing module 130 multiplies a vCPU billing rate by an average number of vCPUs allocated during the billing period.

In other embodiments, the metering and billing data processing module 130 multiplies the vCPU billing rate by a maximum number of vCPUs actually allocated during the billing period. In some examples, the maximum number of vCPUs actually allocated during the billing period differs from a maximum number of vCPUs that may be allocated to a virtual structure. For example, the maximum number of vCPUs allowed to be allocated may be eight and during a particular billing period the actual number of allocated vCPUs may vary between two and four so that the metering and billing data processing module 130 multiplies the vCPU billing rate by four for the billing period. In other embodiments, the metering and billing data processing module 130 multiplies the vCPU billing rate by an average number of allocated vCPUs during the billing period. Where the number of allocated vCPUs during a billing period is between two and four with an average of three, the metering and billing data processing module 130 multiplies the vCPU billing rate by three for the billing period.

In some embodiments, the metering and billing data processing module 130 identifies current allocations for virtual structures of the servers 106 of the customer, multiplies each current allocation by an appropriate rate and then calculates an overall bill for each of the current allocations. In some embodiments, the metering and billing data processing module 130 uses averaged power consumption data to determine the billing information. In some examples, the metering and billing data processing module 130 uses averaged power consumption data of a virtual structure for billing if the averaged power consumption data is above a power threshold.

Once the billing information is calculated, in some embodiments, the metering and billing data processing module 130 transmits billing information to the customer portal GUI 142 in a data presentation layer 140 available to the customer and to the owner. In other embodiments, the billing information goes through the management portal 122. In some embodiments, the averaged metering data is available at the customer portal GUI 142.

In various embodiments, metering data and billing information is transmitted over one or more computer networks (not shown). In some embodiments, the computer networks include a LAN, a WAN, a fiber network, a wireless connection, the Internet, and the like. In some embodiments, the computer networks include multiple networks, which may include private networks and/or public networks.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® (IrDA®). Alternatively, the wireless connection may be a cellular telephone network communication. All standards and/or connection types include the latest version and revision of the standard and/or connection type as of the filing date of this application.

Figure 2:
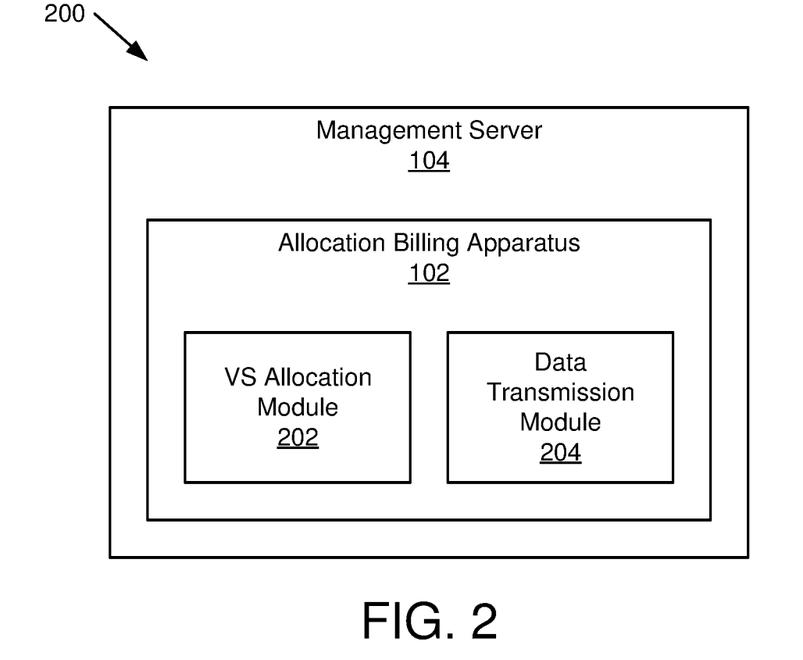
FIG. 2 is a schematic block diagram illustrating an apparatus at an on-premises location for allocation metering, according to various embodiments.

FIG. 2 is a schematic block diagram illustrating an apparatus 200 at an on-premises location for allocation metering, according to various embodiments. The apparatus 200 includes an allocation billing apparatus 102, which may be located in the management server 104. The allocation billing apparatus 102, in various embodiments, includes a VS allocation module 202 and a data transmission module 204, which are described below. In various embodiments, the apparatus 200 is implemented with code executable by a processor and stored on computer readable storage media. In some embodiments, all or a portion of the apparatus 200 is implemented using hardware circuits and/or a programmable hardware device.

The apparatus 200 includes a VS allocation module 202 configured to gather VS allocation data for one or more virtual structures running on one or more servers 106 at a customer location 101 of a customer where the customer leases computing resources from an owner. A virtual structure includes a VM, a container, or other virtual structure capable of running workloads for a client of the customer. The VS allocation data is for a virtual structure of the one or more virtual structures that include allocation of virtual resources for the virtual structure.

In some embodiments, the VS allocation module 202 receives the VS allocation data from a virtualization layer 108 of an application controlling the one or more virtual structures. The application may include VMware®, VROps, Morpheus® Data, Nutanix® Prism®, or the like. In the embodiments, the VS allocation module 202 interacts with the application to receive the VS allocation data regarding virtual structures running on the servers 106. In some embodiments, the VS allocation module 202 receives the VS allocation data from some or all of the servers 106 at the owner location 101.

In some embodiments, the VS allocation module 202 receives the VS allocation data using a management API. In some examples, the management API is the REpresentational State Transfer ("REST") API or similar API. In other embodiments, the VS allocation module 202 receives the VS allocation data over a secure communication protocol. The secure communication protocol, in some embodiments, includes a communication protocol intended to prevent unauthorized parties from viewing the data and may include encryption and/or other techniques known to those of skill in the art to protect data being transmitted. In some embodiments, the secure communication protocol uses full-duplex communication over a single web connection. In some examples, the VS allocation module 202 receives the VS allocation data over a WebSocket, Hypertext Transfer Protocol Secure ("HTTPS"), or similar protocol. Using a WebSocket or similar protocol provides a way of gathering data in real time in a secure way.

In some embodiments, the VS allocation module 202 receives the VS allocation data from virtual structures of the servers 106 in a sequence. In some examples, the VS allocation module 202 receives VS allocation data from a first server 106, then from a second server 106, etc. in a sequence. In some embodiments, the VS allocation module 202 receives the VS allocation data at a periodic rate. In some embodiments, the VS allocation module 202 receives the VS allocation data by accessing the VS allocation data from the virtualization layer of the servers 106 by accessing and pulling the VS allocation data. In other embodiments, the VS allocation module 202 waits for the virtualization layer of each server 106 to transmit the VS allocation data.

The apparatus 200 includes a data transmission module 204 configured to periodically transmit, over the management network, VS allocation data to an owner server 123 of the owner where the owner server 123 is located off-premises 121 from the customer location 101. The management network is different than a computer network servicing workloads of the one or more virtual structures on the one or more servers 106. For example, the data transmission module 204 may transmit the VS allocation data once an hour, once every two hours, once a day, or other suitable time frame. In some embodiments, the data transmission module 204 transmits the VS allocation data for an entire billing period. In other embodiments, the data transmission module 204 transmits the VS allocation data on a more frequent interval so to reduce the amount of data needed to be stored at the customer location 101, to reduce loss of data, and the like. In some embodiments, VS allocation data is stored for more than one periodic transmission so that if a transmission is lost, corrupted, etc., replacement VS allocation data may be retransmitted. For example, if the data transmission module 204 transmits VS allocation data each hour, VS allocation data is stored at the customer location 101 for at least two hours.

Billing information is calculated at the owner server 123 from the VS allocation data and the billing information includes a cost for virtual resources allocated to the one or more virtual structures for the billing period. Unlike other systems that bill based on power consumption, current actual utilization, or allocation set up when a virtual structure is set up, the embodiments described herein provide a way to bill based on a current allocation of virtual resources, such as vCPUs, virtual memory, and virtual data storage, which can change as client needs change over time.

Figure 3:
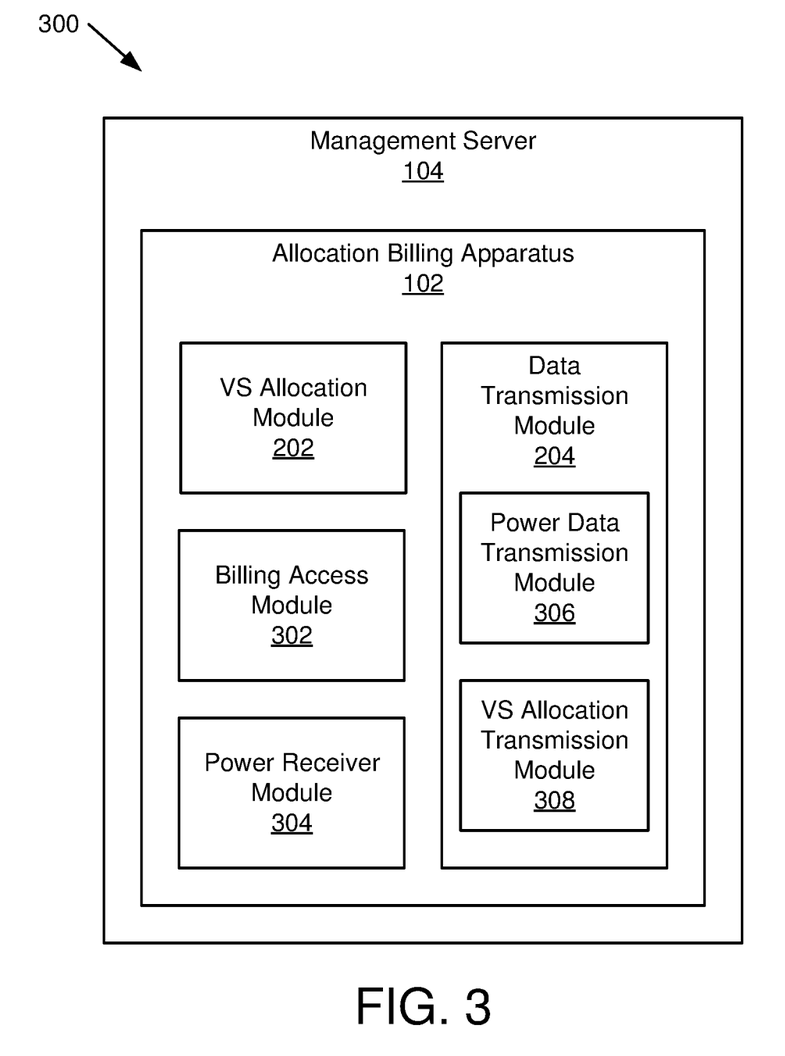
FIG. 3 is a schematic block diagram illustrating another apparatus at an on-premises location for allocation metering, according to various embodiments.

FIG. 3 is a schematic block diagram illustrating another apparatus 300 at an on-premises location for allocation metering, according to various embodiments. The apparatus 300 includes another allocation billing apparatus 102, which is depicted in the management server 104, but may be in another location at the customer location 101. The allocation billing apparatus 102 includes a VS allocation module 202 and a data transmission module 204, which are substantially similar to those described above in relation to the apparatus 200 of FIG. 2. In various embodiments, the apparatus 300 includes a billing access module 302 and/or a power receiver module 304 and in some embodiments the data transmission module 204 includes a power data transmission module 306 and/or a VS allocation transmission module 308, which are described below. In various embodiments, the apparatus 300 is implemented similarly to the apparatus 200 of FIG. 2.

The apparatus 300, in some embodiments, includes a billing access module 302 configured to receive access to billing information regarding a billing period of the VS allocation data. In some embodiments, the billing access module 302 receives access to the billing information by receiving access to a website that has the billing information. In other embodiments, the billing access module 302 receives a bill with the billing information. One of skill in the art will recognize other ways for the billing access module 302 to receive access to the billing information.

The apparatus 300, in some embodiments, includes a power receiver module 304 configured to receive power consumption data from the one or more servers 106, and the data transmission module 204 includes a power data transmission module 306 configured to transmit the power consumption data to the owner server 123 and a VS allocation transmission module 308 that transmits the VS allocation data to the owner server 123. The power receiver module 304, in some embodiments, receives power consumption data from the management controllers 107 in the servers 106. The management controllers 107 typically have access to power consumption data of the servers 106 and/or to power consumption data of all or some of the components of the servers, such as CPUs, memory, graphics processing units ("GPUs"), power supplies, etc.

The management controllers 107 store power consumption data until transmission to the management server 104 via the power receiver module 304. In some embodiments, the power receiver module 304 is a data consumer and accesses the power consumption data at the servers 106 on a periodic basis. In other embodiments, the management controllers 107 of the servers 106 transmit the power consumption data to the management server 104 on a periodic basis. In some embodiments, the power receiver module 304 accesses and downloads power consumption data from the management controllers 107 in a sequence rather than all at the same time. In some examples, the power receiver module 304 has a schedule for accessing and downloading the power consumption data from the various servers 106.

Typically, at least a portion of the power consumption data is analog data. in some embodiments, the management controllers 107 of the servers 106 digitize the power consumption data and the power receiver module 304 receives digital power consumption data. In other embodiments, the power receiver module 304 receives analog power consumption data. The power consumption data is sampled at a faster rate typically than VS allocation data so the power consumption data typically requires more processing than the VS allocation data. For example, the power consumption data may be sampled at a rate of 1 second, 10 seconds, 1 minute, or the like while the VS allocation data may be sampled at rate of 1 hour, 30 minutes, 2 hours, or the like.

In some embodiments, the power receiver module 304 receives the power consumption data over a management network running at the customer location 101. The management network runs using a management network protocol, such as Redfish, Intelligent Platform Management Interface ("IPMI"), Simple Network Management Protocol ("SNMP"), Alert Standard Format ("ASF"), Hypertext Transfer Protocol Hypertext Transfer Protocol Secure ("HTTPS"), or the like.

Periodically, the power data transmission module 306 transmits power consumption data to the owner server 123. In some embodiments, the power data transmission module 306 transmits the power consumption data to the owner server 123 using a pathway and/or transmission method that is the same as for transmission of the VS allocation data. In other embodiments, the power data transmission module 306 transmits the power consumption data to the owner server 123 using a pathway and/or transmission method different than the data transmission module 204 uses for the VS allocation data. In some embodiments, the power consumption data is sampled at a faster rate than VS allocation data and is transmitted in a different way than VS allocation data.

In some embodiments, the power data transmission module 306 transmits the power consumption data using a streaming protocol that assures the power consumption data is received at the owner server 123. In some examples, the power data transmission module 306 transmits the power consumption data using an Apache Kafka application which manages data transmission and storage to assure that power consumption data at the management server 104 is not deleted before verifying that the power consumption data is received and stored properly at the owner location 101.

In some embodiments, the power consumption data is used by the owner server 123 to determine billing. In some embodiments, the power consumption data is used indirectly to determine billing. In some examples, the power consumption data is used to determine actual server utilization to be compared to the VS allocation data, which helps in determining pricing as well as determining if more or less resources are needed at the customer location 101. In other embodiments, the billing information includes the cost for the virtual resources allocated to the one or more virtual structures and power consumption over a power threshold. For example, power consumption may be high due to some workload condition, which may cause the servers to be at a capacity that is undesirable. For example, power consumption over some power threshold may dictate moving workloads to another server 106, throttling one or more servers 106, or some other undesirable condition, which then justifies a policy of a power consumption charge for exceeding a power threshold. In other embodiments, the billing information includes other charges based the power consumption data.

The VS allocation transmission module 308, in some embodiments, transmits the VS allocation data differently than the power data transmission module 306 transmits the power consumption data due to the different nature of the VS allocation data and the power consumption data. In some examples, the VS allocation transmission module 308 transmits the VS allocation data over a secure communication protocol using full-duplex communication over a single web connection. In some examples, the VS allocation transmission module 308 uses a WebSocket or similar secure transmission protocol. In some embodiments, the VS allocation transmission module 308 transmits the VS allocation data using a VPN. One of skill in the art will recognize other was for the power data transmission module 306 to transmit power consumption data and the VS allocation transmission module 308 to transmit VS allocation data.

Figure 4:
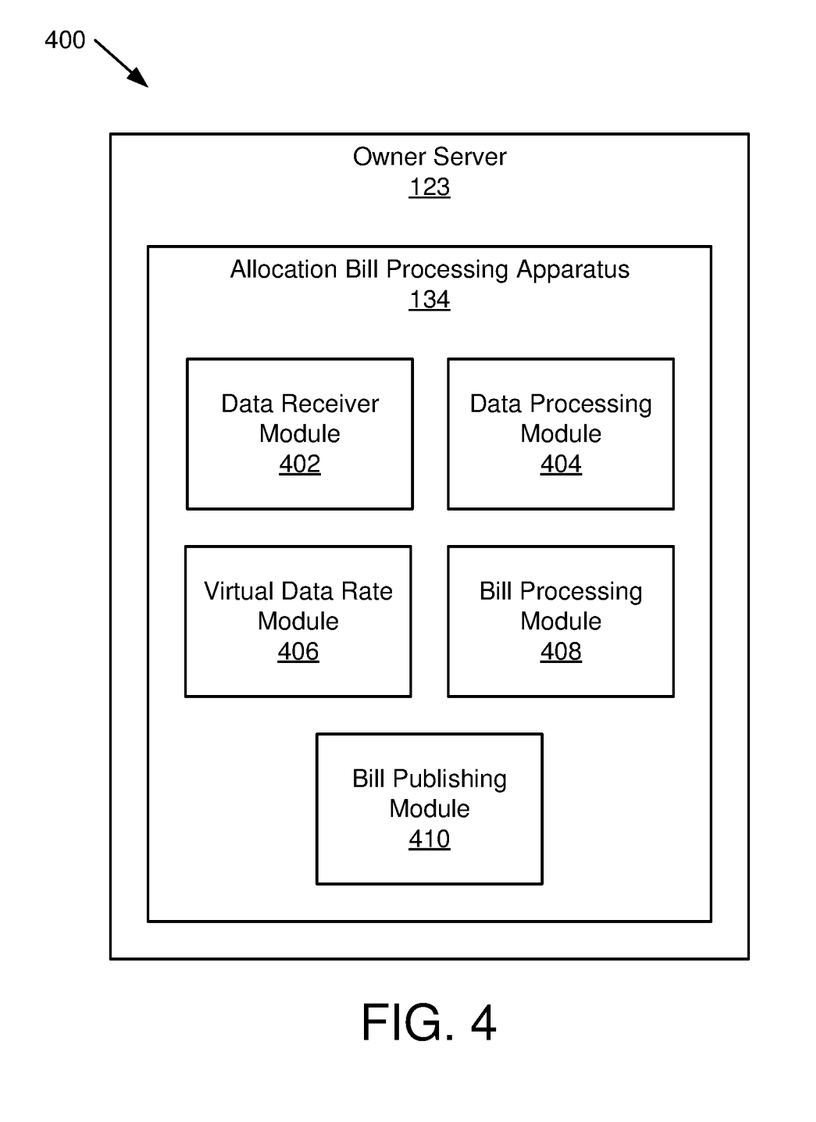
FIG. 4 is a schematic block diagram illustrating an apparatus at an off-premises location for allocation metering, according to various embodiments.

FIG. 4 is a schematic block diagram illustrating an apparatus 400 at an off-premises location for allocation metering, according to various embodiments. The apparatus 400 includes an allocation bill processing apparatus 134 that is depicted in the owner server 123, but may be located elsewhere away from the customer location 101. The allocation bill processing apparatus 134 includes a data receiver module 402, a data processing module 404, a virtual data rate module 406, a bill processing module 408, and/or a bill publishing module 410, which are described below. In various embodiments, the apparatus 400 is implemented with code executable by a processor and stored on computer readable storage media. In some embodiments, all or a portion of the apparatus 400 is implemented using hardware circuits and/or a programmable hardware device.

The apparatus 400 includes, in some embodiments, a data receiver module 402 configured to receive VS allocation data from the management server 104. In other embodiments, the data receiver module 402 receives both VS allocation data and power consumption data from the management server 104. In some embodiments, the data receiver module 402 works in conjunction with the management portal 122 to securely receive VS allocation data and/or power consumption data.

The apparatus 400, in some embodiments, includes a data processing module 404 configured to process VS allocation data. In other embodiments, the data processing module 404 processes the VS allocation data and power consumption data. In some examples, the data processing module 404 processes the VS allocation data by dividing the VS allocation data into certain periods, such as into billing periods. In other embodiments, the data processing module 404 also divides power consumption data into periods and/or billing periods. In other embodiments, the data processing module 404 works with the data cluster 124 to process the VS allocation data and/or the power consumption data. For example, the data cluster 124 may be managed as a Kafka cluster managed by the Apache Kafka software application or similar data structure managed by another software application. In some embodiments, the data processing module 404 stores the VS allocation data and/or the power consumption data in the metering data store 126.

In some embodiments, the data processing module 404 averages the VS allocation data and/or the power consumption data. In some examples, the data processing module 404 applies an averaging algorithm to the power consumption data to average the power consumption data over specific time intervals. The time intervals may be an hour, a day, etc. In some embodiments, the data processing module 404 averages the power consumption data over a billing period.

In other embodiments, the data processing module 404 averages the VS allocation data over a time period. In some embodiments, the VS allocation data is sampled at a rate low enough that averaging is not needed for some time periods. In some embodiments, the data processing module 404 works in conjunction with the averaged data cluster 128 to securely store the averaged metering data, for example, in a Kafka cluster or some other data cluster. For example, the VS allocation data may be sampled each hour and the data processing module 404 averages the power consumption data each hour so averaging is only required for the power consumption data. In some embodiments, once the data processing module 404 averages at least the power consumption data, the data processing module 404 further averages the VS allocation data and/or the power consumption data over the billing period. In some examples, the data processing module 404 averages the VS allocation data over a billing period where the VS allocation data is already sampled on an hourly basis. The averaged VS allocation data is then used to calculate billing for the customer.

In some embodiments, the power consumption data averaged over some time period less than the billing period is adequate. For example, the power consumption data may not be used for billing so that averaging the power consumption data every hour, every day, or some other interval is adequate. In other embodiments, the power consumption data may be averaged over an interval used for determining if the power consumption is over a threshold and the interval may be less than a billing period.

The apparatus 400, in some embodiments, includes a virtual data rate module 406 configured to determine a billing rate for the VS allocation data. In some embodiments, the virtual data rate module 406 receives rate information from a system administrator. In other embodiments, the virtual data rate module 406 calculates billing rates using one or more equations and/or algorithms. In other embodiments, the virtual data rate module 406 changes billing rates to match billing periods. In other embodiments, the virtual data rate module 406 uses power consumption data along with current and/or maximum allocation values for vCPUs, virtual memory, virtual data storage, and other relevant data to calculate billing rates. One of skill in the art will recognize other ways for the virtual data rate module 406 to determine billing rates for the VS allocation data and/or the power consumption data.

The apparatus 400, in some embodiments, includes a bill processing module 408 configured to calculate billing information based on the VS allocation data. In some embodiments, the bill processing module 408 calculates the billing information based on the VS allocation data and the power consumption data, for example when the power consumption data exceeds a threshold. In some embodiments, the bill processing module 408 calculates the billing information using averaged VS allocation data and/or averaged power consumption data. In some embodiments, the bill processing module 408 works in conjunction with the metering and billing data processing module 130.

In some embodiments, the bill processing module 408 multiplies a VS billing rate by the VS allocation data for a virtual structure. In other embodiments, the bill processing module 408 calculates the billing information by multiplying each bit of allocation information for a virtual structure by an applicable rate to determine billable information for the virtual structure. In some examples, the bill processing module 408, for a billing period, multiplies the currently allocated vCPUs by a vCPU rate, multiplies the currently allocated virtual memory by a virtual memory rate and/or the virtual data storage by a virtual data storage rate to determine billing information for the virtual structure for the billing period. The bill processing module 408 may then repeat this billing routine for each virtual structure of each server 106 to determine overall billing information for the billing period.

In other embodiments, the bill processing module 408 adds applicable power consumption billing by determining if power consumption data exceeds a power threshold. In some examples, the power consumption data indicates that CPU power exceeded a threshold where the CPU has vCPUs allocated to a particular virtual structure. The bill processing module 408 may then add a charge for the virtual structure based on the power consumption exceeding the threshold. One of skill in the art will recognize other ways for the bill processing module 408 to determine billing information for the customer based on VS allocation data and/or power consumption data.

The apparatus 400, in some embodiments, includes a bill publishing module 410 configured to make billing information of a billing period available to the customer. In some examples, the bill publishing module 410 adds the billing information to an application that includes the customer portal GUI 142 and the customer is able to log onto the customer portal GUI 142 to access the billing information. In other embodiments, the bill publishing module 410 sends billing information to the customer. In other embodiments, the bill publishing module 410 sends a notification to the customer that the billing information is available at the customer portal GUI 142. One of skill in the art will recognize other ways for the bill publishing module 410 to publish the billing information for a billing period.

Figure 5:
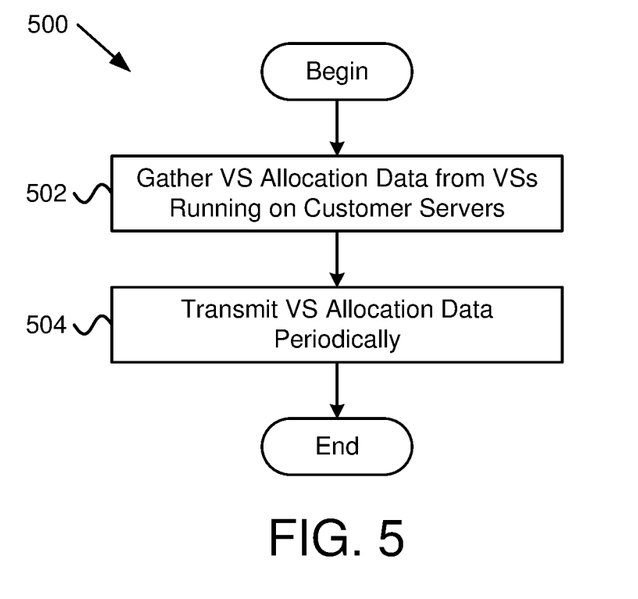
FIG. 5 is a schematic flow chart diagram illustrating a method for allocation metering at an on-premises location, according to various embodiments.

FIG. 5 is a schematic flow chart diagram illustrating a method 500 for allocation metering at an on-premises location, according to various embodiments. The method 500 begins and gathers 502 virtual structure allocation data for one or more virtual structures running on one or more servers 106 at a customer location 101 of a customer. A virtual structure is a VM or a container and the VS allocation data is for a virtual structure of the one or more virtual structures that include allocation of virtual resources for the virtual structure. The customer leases computing resources from an owner. The method 500 periodically transmits 504, over a management network, VS allocation data to an owner server 123 of the owner. The owner server 123 is located off-premises (e.g. 121) from the customer location 101. Billing information is calculated at the owner server 123 from the VS allocation data and the billing information includes a cost for virtual resources allocated to the one or more virtual structures for the billing period. In various embodiments, all or a portion of the method 500 is implemented using the VS allocation module 202 and/or the data transmission module 204.

Figure 6:
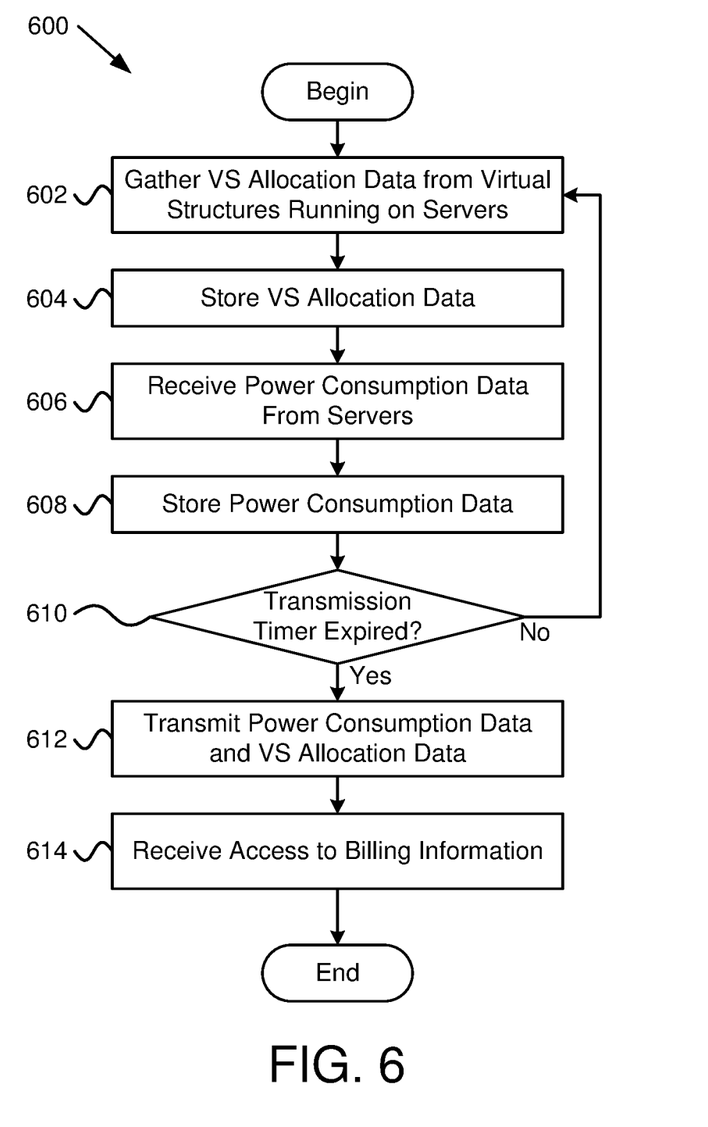
FIG. 6 is a schematic flow chart diagram illustrating another method for allocation metering at an on-premises location, according to various embodiments.

FIG. 6 is a schematic flow chart diagram illustrating another method 600 for allocation metering at an on-premises location, according to various embodiments. The method 600 begins and gathers 602 VS allocation data for one or more virtual structures running on one or more servers 106 at a customer location 101 of a customer and stores 604 the VS allocation data. In some embodiments, the method 600 gathers 602 VS allocation data from a first server 106, from a second server 106, etc. in a sequence. A virtual structure is a VM or a container. The VS allocation data is for a virtual structure of the one or more virtual structures that include allocation of virtual resources for the virtual structure. The customer leases computing resources from an owner.

The method 600 receives 606 power consumption data from the one or more servers 106 and stores 608 the power consumption data at the customer location 101. In some embodiments, the method 600 sequences through the servers 106 while gathering the power consumption data. In other embodiments, the method 600 gathers 602 power consumption data from each server 106 on a periodic basis. The method 600 determines 610 if a transmission timer has expired. If the method 600 determines 610 that the transmission timer has not expired, the method 600 returns and gathers VS allocation data from the virtual structures.

If the method 600 determines 610 that the transmission timer has expired, the method 600 transmits 612, over a management network, VS allocation data and/or power consumption data to an owner server 123 of the owner where the owner server 123 is located off-premises (e.g. 121) from the customer location 101. In other embodiments, the method 600 uses another method to periodically transfer VS allocation data and/or power consumption data to the owner server 123, such as receiving a signal, notification, etc. from the owner server 123. In other embodiments, the method 600 makes available the VS allocation data and/or the power consumption data to the owner server 123 for data retrieval. One of skill in the art will recognize other ways for the method 600 to transfer VS allocation data and/or power consumption data to the owner server 123.

Billing information is calculated at the owner server 123 from the VS allocation data and the power consumption data. The billing information includes a cost for virtual resources allocated to the one or more virtual structures for the billing period. In some embodiments, the billing information also includes power consumption over a threshold. The method 600 receives 614 access to the billing information, for example, by receiving a bill or by receiving access to a website with the billing information, and the method 600 ends. In various embodiments, all or a portion of the method 600 is implemented using the VS allocation module 202, the data transmission module 204, the billing access module 302, the power receiver module 304, the power data transmission module 306, and/or the VS allocation transmission module 308.

Figure 7:
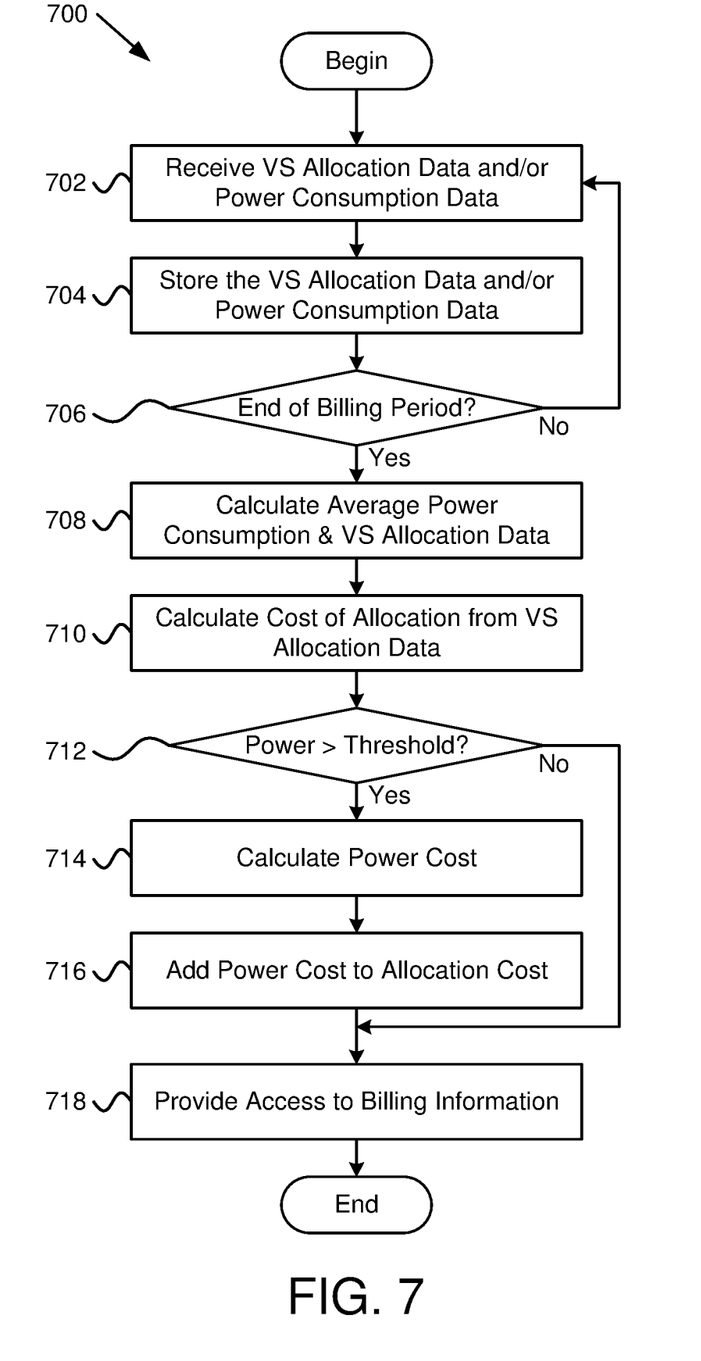
FIG. 7 is a schematic flow chart diagram illustrating a method for allocation metering at an off-premises location, according to various embodiments.

FIG. 7 is a schematic flow chart diagram illustrating a method for allocation metering at an off-premises location, according to various embodiments. The method 700 begins and receives 702 VS allocation data and/or power consumption data at an owner server 123 at an owner location 121 from a management server 104 at a customer location 101. The method 700 stores 704 the VS allocation data and/or power consumption data at the owner location 121. In some embodiment, the method 700 receives multiple transmissions of VS allocation data and/or power consumption data for a particular billing period and stores 704 the VS allocation data and/or power consumption data.

The method 700 determines 706 if an end of a billing period has occurred. If the method 700 determines 706 that the end of the billing period has not occurred, the method 700 returns and continues to receive 702 VS allocation data and/or power consumption data from management server 104. In other embodiments, the method 700 receives 702 VS allocation data and/or power consumption data by retrieving VS allocation data and/or power consumption data from the management server 104. Note that receiving 702 or retrieving VS allocation data and/or power consumption data from the management server 104 also includes receiving the VS allocation data and/or power consumption data from another device at the owner location 101. For example, the management server 104 may be involved with directing the method 700 where to retrieve the VS allocation data and/or the power consumption data.

If the method 700 determines 706 the end of the billing period has occurred, the method 700 calculates 708 average power consumption and/or average VS allocation data for a particular time period. In some embodiments, the VS allocation data is sampled at a rate where averaging over the particular time period is not necessary. In some embodiments, the time period is shorter than the billing period. In other embodiments, the time period is a billing period. In some embodiments, the method 700 calculates 708 average VS allocation data and/or average power consumption data over time period smaller than the billing period and then also calculates 708 average VS allocation data and/or average power consumption data over the billing period. Average power consumption data and/or average VS allocation data over a period smaller than the billing period may be useful in some instances.

The method 700 calculates 710 a cost of allocation from the VS allocation data and/or averaged VS allocation data. In some embodiments, the method 700 calculates 710 the cost of allocation from a peak allocation during the billing period, for example, if the VS allocation data is averaged or sampled over a time period less than the billing period. In other embodiments, the method 700 uses the average of the VS allocation data over the billing period. In some embodiments, calculating 710 the allocation cost includes multiplying an allocation billing rate by the average allocation or maximum allocation of the VS allocation data during the billing period.

The method 700 determines 712 if the power consumption data is over a power threshold. If the method 700 determines 712 that the power consumption data is over the power threshold, the method 700 calculates 714 a power cost and adds 716 the power cost to the allocation cost and provides 718 access to the billing information to the customer, and the method 700 ends. If the method 700 determines 712 that the power consumption data is not over the power threshold, the method 700 provides 718 access to the billing information to the customer, and the method 700 ends. In various embodiments, all or a portion of the method 700 is implemented using the data receiver module 402, the data processing module 404, the virtual data rate module 406, the bill processing module 408, and/or the bill publishing module 410.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    receiving an allocation request to change an allocation of a virtual resources of a first virtual structure ("VS") that runs on one or more servers at a customer location of a customer, the virtual structure comprising a virtual machine ("VM") or a container, the virtual resources comprising an amount of virtual central processing units, an amount of virtual memory, and/or an amount of virtual storage, and the customer leasing computing resources comprising the one or more servers from an owner, the customer leasing computing resources comprising the one or more servers from an owner;
    executing one or more workloads using the first VS and the allocated virtual resources thereof;
    gathering VS allocation data periodically for one or more virtual structures running on the one or more servers, the one or more virtual structures including the first virtual structure, the VS allocation data indicating for a period of time the amount of virtual central processing units, the amount of virtual memory, and/or the amount of virtual storage allocated to each of the one or more virtual structures; and
    periodically transmitting, over a management network, the VS allocation data to an owner server of the owner, the owner server located off-premises from the customer location, the management network different than a computer network that services client workloads of the one or more virtual structures on the one or more servers, the client workloads including the one or more workloads executed using the first VS and the allocated virtual resources thereof,
    wherein billing information is calculated at the owner server from the VS allocation data, the billing information comprising a cost for virtual resources allocated to the one or more virtual structures for a billing period.

2. The method of claim 1, further comprising:
    receiving power consumption data from the one or more servers; and
    transmitting the power consumption data to the owner server,
    wherein the billing information comprises the cost for the virtual resources allocated to the one or more virtual structures and power consumption over a threshold.

3. The method of claim 2, wherein transmitting the power consumption data comprises transmitting the power consumption data using a streaming protocol that assures the power consumption data is received at the owner server.

4. The method of claim 2, wherein receiving the power consumption data comprises receiving, over the management network, power consumption data from a management controller running on each of the one or more servers at the customer location.

5. The method of claim 1, wherein the virtual resources allocated to the one or more virtual structures for the billing period comprises an average of the virtual resources allocated to the one or more virtual structures for the billing period.

6. The method of claim 1, wherein transmitting the VS allocation data comprises transmitting the VS allocation data over a secure communication protocol using full-duplex communication over a single web connection.

7. The method of claim 1, further comprising receiving access to the billing information regarding a billing period of the VS allocation data.

8. The method of claim 1, wherein the VS allocation data for a virtual structure of the one or more virtual structures comprises a number of virtual central processing units ("CPUs") allocated to the virtual structure, virtual memory allocated to the virtual structure, and/or virtual data storage allocated to the virtual structure.

9. The method of claim 1, wherein gathering the VS allocation data comprises gathering the VS allocation data from a virtualization layer of an application controlling the one or more virtual structures.

10. The method of claim 1, wherein gathering the VS allocation data comprises gathering the VS allocation data using a management application protocol interface ("API") to receive the VS allocation data over a secure communication protocol using full-duplex communication over a single web connection.

11. The method of claim 1, wherein periodically transmitting, over the management network, the VS allocation data to the owner server comprises periodically transmitting the VS allocation data over a virtual private network between a management server at the customer location and the owner server located off-premises from the customer location.

12. An apparatus comprising:
a processor; and
non-transitory computer readable storage media storing code, the code being executable by the processor to perform operations comprising:
receiving an allocation request to change an allocation of a virtual resources of a first virtual structure ("VS") that runs on one or more servers at a customer location of a customer, the virtual structure comprising a virtual machine ("VM") or a container, the virtual resources comprising an amount of virtual central processing units, an amount of virtual memory, and/or an amount of virtual storage, and the customer leasing computing resources comprising the one or more servers from an owner, the customer leasing computing resources comprising the one or more servers from an owner;
executing one or more workloads using the first VS and the allocated virtual resources thereof;
gathering VS allocation data periodically for one or more virtual structures running on the one or more servers, the one or more virtual structures including the first virtual structure, the VS allocation data indicating for a period of time the amount of virtual central processing units, the amount of virtual memory, and/or the amount of virtual storage allocated to each of the one or more virtual structures; and
periodically transmitting, over a management network, the VS allocation data to an owner server of the owner, the owner server located off-premises from the customer location, the management network different than a computer network that services client workloads of the one or more virtual structures on the one or more servers, the client workloads including the one or more workloads executed using the first VS and the allocated virtual resources thereof,
wherein billing information is calculated at the owner server from the VS allocation data, the billing information comprising a cost for virtual resources allocated to the one or more virtual structures for a billing period.

13. The apparatus of claim 12, the operations further comprising:
receiving power consumption data from the one or more servers; and
transmitting the power consumption data to the owner server,
wherein the billing information comprises the cost for the virtual resources allocated to the one or more virtual structures and power consumption over a threshold.

14. The apparatus of claim 13, wherein:
transmitting the power consumption data comprises transmitting the power consumption data using a streaming protocol that assures the power consumption data is received at the owner server; and/or
receiving the power consumption data comprises receiving, over the management network, power consumption data from a management controller running on each of the one or more servers at the customer location.

15. The apparatus of claim 12, wherein the virtual resources allocated to the one or more virtual structures for the billing period comprises an average of the virtual resources allocated to the one or more virtual structures for the billing period.

16. The apparatus of claim 12, wherein transmitting the VS allocation data comprises transmitting the VS allocation data over a secure communication protocol using full-duplex communication over a single web connection, wherein the secure communication protocol is a secure bi-directional connection supporting real-time data transmission.

17. The apparatus of claim 12, wherein the VS allocation data for a virtual structure of the one or more virtual structures comprises a number of virtual central processing units ("CPUs") allocated to the virtual structure, virtual memory allocated to the virtual structure, and/or virtual data storage allocated to the virtual structure.

18. The apparatus of claim 12, the operations further comprising receiving access to billing information regarding a billing period of the VS allocation data.

19. A program product comprising a non-transitory computer readable storage medium storing code, the code being configured to be executable by a processor to perform operations comprising:
receiving an allocation request to change an allocation of a virtual resources of a first virtual structure ("VS") that runs on one or more servers at a customer location of a customer, the virtual structure comprising a virtual machine ("VM") or a container, the virtual resources comprising an amount of virtual central processing units, an amount of virtual memory, and/or an amount of virtual storage, and the customer leasing computing resources comprising the one or more servers from an owner, the customer leasing computing resources comprising the one or more servers from an owner;
executing one or more workloads using the first VS and the allocated virtual resources thereof;
gathering VS allocation data periodically for one or more virtual structures running on the one or more servers, the one or more virtual structures including the first virtual structure, the VS allocation data indicating for a period of time the amount of virtual central processing units, the amount of virtual memory, and/or the amount of virtual storage allocated to each of the one or more virtual structures; and
periodically transmitting, over a management network, the VS allocation data to an owner server of the owner, the owner server located off-premises from the customer location, the management network different than a computer network that services client workloads of the one or more virtual structures on the one or more servers, the client workloads including the one or more workloads executed using the first VS and the allocated virtual resources thereof,
wherein billing information is calculated at the owner server from the VS allocation data, the billing information comprising a cost for virtual resources allocated to the one or more virtual structures for a billing period.

20. The program product of claim 19, the code further configured to be executable by a processor to perform operations comprising:
receiving power consumption data from the one or more servers; and
transmitting the power consumption data with the VS allocation data,
wherein the billing information comprises the cost for the virtual resources allocated to the one or more virtual structures and power consumption over a threshold.

* * * * *